United States Patent [19]

Pascale et al.

[11] Patent Number: 4,902,421
[45] Date of Patent: Feb. 20, 1990

[54] FILTER DEVICE

[75] Inventors: Frank R. Pascale; Vlado I. Matkovich, both of Glen Cove, N.Y.

[73] Assignee: Pall Corporation, Glen Cove, N.Y.

[21] Appl. No.: 201,284

[22] Filed: May 19, 1988

Related U.S. Application Data

[63] Continuation of Ser. No. 929,352, Nov. 12, 1986.

[51] Int. Cl.$^4$ ............................................. B01D 29/00
[52] U.S. Cl. .................. 210/416.1; 210/459; 210/445; 128/764; 604/190; 604/236
[58] Field of Search ..................... 210/416.1, 418, 459, 210/461, 348, 445; 422/100–102; 128/763, 765–767; 604/190, 212–216, 236, 237; 73/863.23, 864.01, 864.15; 222/189, 212

[56] References Cited

U.S. PATENT DOCUMENTS

| | | | |
|---|---|---|---|
| 1,853,260 | 9/1929 | Crossett | 604/217 |
| 1,963,080 | 9/1932 | Featherstone | 73/863.23 |
| 3,003,500 | 10/1955 | Barton et al. | 604/212 |
| 3,620,418 | 11/1971 | Stevens et al. | 604/217 |
| 3,698,561 | 10/1972 | Babson | 604/212 |
| 3,892,226 | 7/1975 | Rosen | 604/190 |
| 3,938,513 | 2/1976 | Hargost | 604/190 |
| 3,985,032 | 10/1976 | Avakian | 422/101 |
| 4,066,079 | 1/1978 | Chiarolla | 604/190 |
| 4,391,274 | 7/1983 | Kagan | 604/190 |

FOREIGN PATENT DOCUMENTS 698619 10/1940 Fed. Rep. of Germany ...... 422/100

Primary Examiner—W. Gary Jones
Assistant Examiner—Coreen Y. Lee
Attorney, Agent, or Firm—Leydig, Voit & Mayer

[57] ABSTRACT

A device for reducing the amount of particulate contaminant in a liquid is provided which includes a hollow elongate member having first and second openings and filter means, preferably depth filter means, positioned in the elongate member, the filter means in combination with the elongate member defining a reservoir between the filter means and the first opening. The device is intended to be used with means associated with the first opening for generating a pressure differential between the interior of the elongate member and the exterior thereof whereby a liquid containing particulate contaminant may be introduced into the reservoir in the elongate member through the second opening, particulate contaminant being trapped within the filter means and a liquid with a reduced particulate contaminant may be removed from the elongate member through the second opening.

29 Claims, 2 Drawing Sheets

FILTER DEVICE

This application is a continuation of application Ser. No. 06/929,352 filed Nov. 12, 1986.

TECHNICAL FIELD

The present invention relates to devices for filtering particulate-containing fluids. More particularly, the present invention relates to disposable devices for reducing the amount of particulate contaminant in a liquid sample.

BACKGROUND OF THE INVENTION

Liquids subjected to analysis in some instances contain sediment or particulate contaminants which interfere with the qualitative and/or quantitive tests performed on the liquid sample. In some situations, such as the analysis of biological fluids, particularly body fluids such as urine, it may not be necessary to totally eliminate all particulate contaminants, but merely to reduce the amount of such contaminants to below the level or amount which interferes with the particular test being performed. Current practice accomplishes such a reduction in concentration of particulate contaminants with a variety of devices and associated techniques. Most of the devices and techniques involve drawing or passing the liquid sample (specimen) through a course filter which permits passage of purified liquid (filtrate) through the filter, the filtrate being drawn off from the downstream side of the device, while the particulate contaminant is retained on the upstream side of the filter. In some of these devices, the filter is discarded after transfer of the liquid component of the sample. With other devices used for such purposes the entire device is disposed of after use.

Some of these devices have shortcomings associated with the manner in which the device is manipulated or liquids are transferred. For example, introducing a sample at an upstream side of the device and removing filtrate from a downstream side of the device permits several potential sites of leakage. Additionally, with some of the devices, additional pieces of apparatus are required to successfully complete the transfer of filtrate. Many of the devices currently employed are also difficult to manipulate by all but those with above average dexterity. Furthermore, many of the techniques and devices currently employed require multiple steps which increase both the amount of time spent in transferring material and the potential for losses and contamination occurring during transfer and disposal of material.

The present invention permits facile sampling, reduces transfer problems, and reduces the potential for contamination of the sample while removing a substantial amount of particulate contaminant from the liquid, retaining the trapped particulate material in the device, and providing filtered liquid with reduced particulate concentrations. The devices perform the sampling of liquid specimen, separation of particulate contaminant from the liquid component and transfer of the substantially particulate-free liquid using a single piece of equipment, which is disposable, in essentially a single, continuous operation.

DISCLOSURE OF INVENTION

The present invention is directed to devices suitable for reducing the amount of particulate contaminant in a liquid. These devices overcome many of the shortcomings of the prior art in that they provide facile operation, reduce the potential for leakage and contamination and, in most instances, are intended to be disposable.

One embodiment of the present invention includes a hollow elongate member having first and second openings and depth filter means positioned in the elongate member. The depth filter means in combination with the hollow elongate member defines a reservoir between the depth filter means and the first opening. The device is intended to be used with a means associated with the first opening for generating a pressure differential between the interior of the elongate member and the exterior thereof to introduce a liquid containing particulate contaminant to the reservoir in the elongate member through the second opening. Particulate contaminant is trapped within the depth filter means and a liquid with reduced particulate contaminant may be removed from the elongate member through the second opening.

Other embodiments according to the present invention include a device having a hollow elongate member having at least first and second openings and means associated with the first opening for permitting ingress of liquid into the elongate member through the first opening while retarding egress of liquid from the elongate member through the first opening. The device also includes means associated with the second opening for permitting egress of liquid from the elongate member through the second opening while retarding ingress of liquid into the elongate member through the second opening. Also provided in the device are filter means positioned in the elongate member between the first and second openings.

Other embodiments of the present invention include devices for reducing the particulate contaminant in a liquid which comprise a hollow elongate member having an opening and filter means positioned in the hollow elongate member which has first and second sides, the first side facing the opening and the second side, in combination with the internal walls of the hollow elongate member, defining a reservoir. Valve means are also provided which are associated with the filter means for permitting substantially unfiltered liquid to flow from the opening to the reservoir in a first direction and filtered liquid to flow from the reservoir through the filter means to the opening in a second direction.

BEST MODES OF THE INVENTION

Figure 2B:
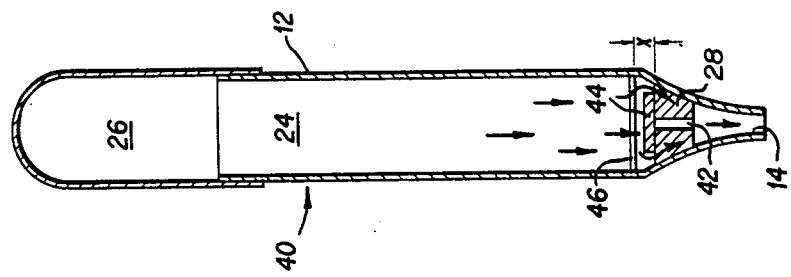
FIG. 2B illustrates the embodiment of FIG. 2A in a discharging mode.

Each of the embodiments of the present invention, although differing in some features are operated in a similar manner.

In the figures, like elements are represented by like reference numerals.

Figure 1:
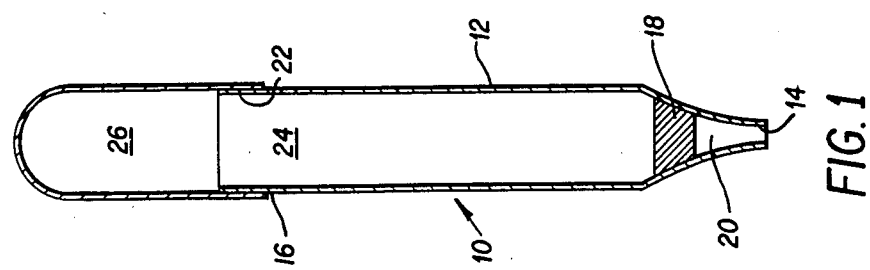
FIG. 1 illustrates to a first embodiment of the present invention.

A first embodiment of the present invention is illustrated in FIG. 1. The device for reducing the amount of particulate contaminant in a liquid sample, generally designated 10, includes a hollow member 12, typically having an elongated shape and having a lower open end 14 and an upper end 16. The hollow member 12 preferably has a circular cross section and preferably is formed from an inert, transparent material, such as glass or plastic. Typically materials such as polycarbonates, polystyrene, or polyolefins such as polyethylene and polypropylene may be used. However, other cross-sectional configurations and other materials may also be used. The term "inert" as used herein, refers to a lack of chemical reactivity toward solvents which may be employed and substances present in the specimen, particularly in biological samples, such as bodily fluids, and at various pH conditions, particularly those values encountere in biological fluids, such as body fluids.

Particularly preferred as the hollow or tubular member 12 is an elongated tube of circular cross section, having generally parallel walls and tapering toward the lower open end 14. Particularly preferred as the hollow member is a glass or plastic tube similar in shape to a laboratory pipette or eyedropper.

Located in tubular member 12 near the opening 14 is a porous element 18 which functions as a depth filter. Depth filters, useful in the present invention, typically comprising a body of fibrous or filamentary material, function by providing a body of filtering material which includes tortuous paths for the fluid being filtered and traps particulate material at various points along those tortuous paths, that is, within the depths of the filter medium, giving rise to the conventional descriptive name, depth filter, i.e., such filters provide dirt capacity by retaining dirt within the body of the filter medium. Thus, a depth filter differs from a surface filter in that particulate matter is trapped largely or exclusively by mechanical interactions, i.e., particles being held within pores having dimensions smaller than that of the particle. Depending on the materials from which the depth filter is formed and the substances passing through the filter, molecular interactions, such as Van der Waals forces, etc., may also contribute to particle retention. When a device is used such as the first embodiment of the present invention, illustrated in FIG. 1, in which the flow of liquid is bi-directional, that is, filtrate flows in a direction opposite to that of the incoming liquid sample and thereby, comes in contact with the first surface of the filter, it is particularly undesirable for the filtrate, having undergone reduction in the amount of particulate contaminate present, to again contact particulate material which may be present on the first surface of the filter material and, which if easily dislodged, may reenter the filtrate stream as the filtrate exits the device. Accordingly, a depth filter in which particles are trapped within internal pores is desirable for such embodiments as compared to a surface filter in which particulate contaminants are trapped on the surface.

The choice of material to be used in a depth filter may vary with the particular application of the device. However, like the elongated hollow member 12, the filters used in the present invention may be formed from any material which is inert or chemically unreactive toward the liquids employed and substantces dissolved in the liquids. Preferred as the depth filtration material is a hydrophobic material. Examples of preferred materials include polyolefins and particularly polypropylene. Glass fibers may also be employed when disposed so as to provide high loft. Particularly preferred is a filter material comprising a web of non-woven polypropylene microfibers available from Pall Corporation under the Trademark of HDC.

It is also preferred that the depth filter be spaced from the opening 14 so that the internal walls of the hollow member and a surface of the depth filter 18 define a first chamber or antechamber 20 at the tip of the hollow member. The depth filter 18 may, however, be located at the opening 14 such that no antechamber 20 is included in the device 10. In the space between a second, upper opening 22 and the depth filter 18 and defined by the upper surface of the depth filter 18 and the walls of the hollow member 12, is a reservoir 24 for retaining liquid which has passed through the depth filter 18 as it is drawn from the container holding the liquid sample.

Attached to the hollow member 12 at the opening 22 is a means for effecting a differential pressure between the inside and outside of the hollow member 12, such as an aspirator bulb or the like 26.

The device illustrated in FIG. 1 may be operated by evacuating the hollow member 12, e.g., by squeezing (compressing) the aspirator bulb 26. While maintaining the bulb 26 in a depressed or squeezed form, the end of the hollow member 12 having the opening 14 is placed below the surface of a liquid sample and the bulb 26 released slowly in order to create a partial vacuum in the device 10 and draw liquid in through the opening 14. As the liquid fills the hollow member 12, it passes through the depth filter 18 where particulate matter is trapped. The liquid then passes into and begins to fill reservoir 24. While a partial vacuum still remains within the device 10, that is, before the aspirator bulb 26 is completely filled or inflated, the device is removed from the liquid sample in order to draw in a small amount of air through opening 14, thereby purging the lower tip of the hollow member 12 and the depth filter 18 of liquid.

The filtrate in the reservoir 24 has a substantially reduced amount of particulate contaminants, which contaminants are trapped within the interstices of the depth filter 18. To transfer the purified filtrate from the device 10 to a receiver, the bulb 26 is again compressed to discharge liquid from the hollow member 12 and evacuate the device. Use of a porous or microporous hydrophobic material as the depth filter is preferred because of the affinity of hydrophobic materials for biological substances which, in addition to the mechanical interaction of the particulate contaminants with the walls of the filter pores, assists in retention of the particulate contaminants. However, hydrophilic materials may be used in this embodiment if tests show stronger attraction for specific substances.

Bi-directional flow of liquid takes place in the first, second, and fourth embodiments of the invention, that is, liquid, particulate-containing sample is drawn into the device in a first sampling and filtration step, and liquid is discharged in a second and opposite direction through the same opening 14 in a second step. In the preferred embodiment of device 10, illustrated in FIG. 1, particulate contaminants which are removed from the sample in the first step are substantially completely retained by the depth filter 18 and prevented from returning to the purified filtrate as it passes through the filter in the second direction.

Figure 2A:
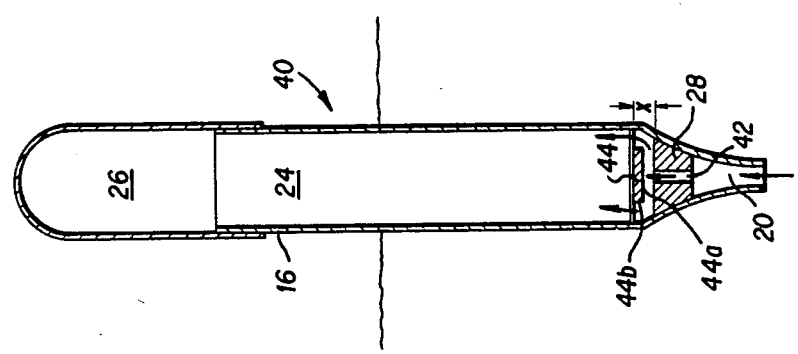
FIG. 2A illustrates a second embodiment of the present invention in a filling mode.

A second preferred embodiment of the present invention, designated generally as 40, is illustrated in FIGS. 2A and 2B. Like reference numerals are used to designate the same or similar elements as shown in FIG. 1. Unlike the filter 18 used in the preferred embodiment of FIG. 1, the filter member 28 differs from the corresponding member of the first embodiment in one important respect. Notably, the filter element 28 is provided with at least one aperture 42 passing from a first liquid-contacting surface to a second liquid-contacting surface and providing means for fluid communication between the first chamber 20 and the second chamber 24. When a single aperture 42 is employed, it is placed preferably at the center of the filter member 28. The aperture 42 permits flow of particulate-containing liquid into the reservoir 24 of the hollow member 12 after entering the device through opening 14, as shown by the arrows in FIG. 2A. As will be discussed in greater detail below, aperture 42, in communicating between the first chamber 20 and the second chamber 24, serves as a component of a one-way valve means which permits substantially free ingress of liquid into the hollow member through, the first opening and thence to the reservoir 24 while retarding free egress of unfiltered liquid out of the reservoir and the hollow member through the first opening. Attached to the hollow member 12 at the opening 22 is a means for effecting a differential pressure between the inside and outside of the hollow member, such as an aspirator bulb or the like 26.

The filter member 28 of the preferred embodiment illustrated in FIG. 2 is preferably a depth filter of the same or similar material as filter member 18 employed in the preferred embodiment shown in FIG. 1. However, contrary to the embodiment in FIG. 1, filter member 28 in the embodiment shown in FIG. 2 may be a surface filter.

Within the second or reservoir chamber 24, is located a movable means for sealing the aperture(s) 42. Preferably, the movable sealing means is a disc 44 formed from a material which is capable of floating in the particulate-containing liquid upon ingress thereof into the reservoir 24 through the aperture(s) 42. Preferably, the movable sealing means is formed from a solid or microporous hydrophobic material. The dimensions of the movable sealing means 44 should be such that when resting on the filter member 28, all apertures 42 are covered by the sealing means when the sealing means is in contact with an internal wall of the hollow member and oriented such that the longest dimension of the sealing means is parallel to the surface of the filter member 28 which faces the reservoir 24. Thus, when employing the preferred embodiment of the movable sealing means, a disc 44 having a longer dimension 44a and a shorter dimension 44b, the disc will be oriented such that the surface 44a will be in contact with the surface of the filter member 28 facing the reservoir when the device 40 is either in an empty or discharging state. The longest dimension of the movable sealing means should not, however, be great enough to entirely cover the surface of the filter member 28 which faces the reservoir 24. That is, the longest dimension of the movable sealing means, such as 44a of disc 44, should be less than the diameter of the hollow member. In a particularly preferred embodiment in which the hollow portion of the hollow member has a circular cross section, and disc 44 is circular, the diameter of disc 44 should be smaller than the internal diameter of the hollow member 12 such that, when the disc 44 is located at the center of the hollow member and in contact with filter member 28, an annular surface of the filter member 28 is exposed.

To prevent the movable sealing means from being disturbed while filling and coming to rest on a shorter dimension, such as 44b, when liquid is being discharged from the device 40, and thereby defeating the sealing function, a retaining means 46 is provided in the second chamber 24 spaced from the surface of the filter member facing the second chamber by a distance which is less than the longest dimension of the movable sealing means. Thus, as illustrated in FIG. 2, the distance between the retaining means 46 and the surface of the filter member 28 facing the second chamber 24, designated as "x", should be less than the longest length of the surface 44a. In this manner, the retaining means assists proper sealing in a discharge mode and prevents the sealing disc 44 from turning over completely or resting on a side surface 44b. In addition, the retaining means prevents loss of the movable sealing means when a partial vacuum is created in the hollow member 12 upon release of the aspirator bulb 26.

The retaining means may be of any suitable material which is inert toward the liquid and substances reaching the reservoir chamber 24. The retaining means 46 may be of any construction which permits unrestricted flow of liquids within the reservoir 24. Thus, the retaining means 46 may be a screen such as an open wire mesh of an inert material, such as stainless steel wire, plastic, or the like.

The preferred embodiment illustrated in FIGS. 2A and 2B is operated in essentially the same manner as the device illustrated in FIG. 1. Thus, aspirator bulb 26 is compressed to evacuate air from the device 40. While maintaining the aspirator bulb in a compressed state, the tip of device 40 is placed in a liquid sample such that opening 14 is below the surface of the liquid sample. The bulb is slowly released and liquid enters the device in the direction shown by the arrows in FIG. 2A as a result of the difference in pressure between the interior of the hollow member 12 and the outside. The particulate-containing liquid entering the hollow member 12 passes through the opening 14 into the first chamber 20 and then through the aperture(s) 42. As liquid passes through apertures(s) 42, the movable sealing means 44 rises off its seat on top of the filter member 28. The incoming liquid, containing substantially the same concentration of particulate contaminant as the liquid entering opening 14 rises within the reservoir 24. The disc 44 which floats in the incoming particulate containing liquid is prevented from rising beyond a distance x by the retaining member 46. When a suitable volume of particulate-containing liquid has filled the reservoir 24 and while the aspirator bulb is still somewhat compressed, the tip of device 40 is preferably removed from the liquid sample while continuing to release the aspirator bulb. This, as in the operation of the device 10 illustrated in FIG. 1, purges remaining liquid from chamber 20 and the filter member 28, primarily aperture(s) 42. At this stage in the operation of the device 40, the particulate-containing liquid in the reservoir 24 has substantially the same concentration of particulate contaminants as the originally liquid sample. Only very small amounts of particulate contaminant are removed when the incoming liquid contacts the surface of the aperture(s) 42 or the surface of the filter member 28 facing opening 14.

The liquid contained in reservoir 24 is discharged from the device in a second step which effects removal of particulate contaminant. That is, aspirator bulb 26 is again compressed increasing the pressure over the column of liquid in the reservoir and creating a pressure differential between the hollow member 12 and the exterior of the device. This forces disc 44 into contact with filter member 28 sealing off aperture(s) 42. Since disc 44 is smaller than the side of filter member 28 facing the reservoir, liquid passes through the exposed portion of the filter member 28 and, in doing so, filters the discharging liquid, retaining particulate contaminants on (in the case of a surface filter) or in (in the case of a depth filter) the filter member 28. Thus, the preferred embodiments of the present invention illustrated in FIGS. 1 and 2A and 2B operate in the similar manner in that both involves a two-step procedure and a bi-directional flow of liquid through the same opening 14. However, the device illustrated in FIG. 1 accomplishes filtration primarily in the filling step as liquid enters reservoir 24; whereas, the device illustrated in FIGS. 2A and B accomplish filtration as liquid is discharged from the reservoir through filter member 28.

Figure 3B:
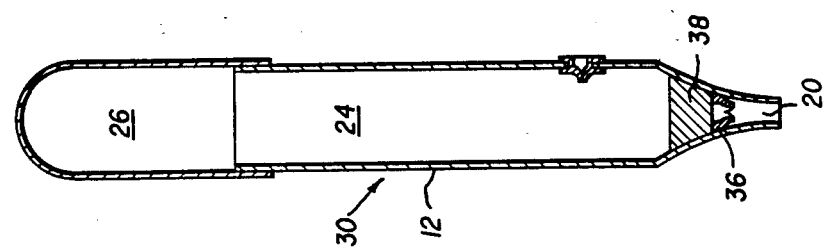
FIG. 3B illustrates a third embodiment of the present invention in a discharging mode.
Figure 3A:
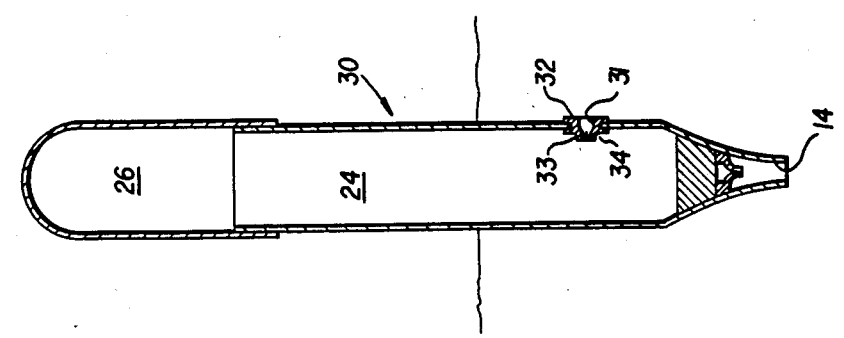
FIG. 3A illustrates a third embodiment of the present invention in a filling mode.

The third preferred embodiment will be better understood by reference to FIGS. 3A and 3B which illustrate a preferred embodiment at different stages of use. In FIGS. 3A and B where like members are correspondingly identified, a preferred device according to the present invention is designated generally by 30. A hollow elongate member 12 is provided having a first opening 31 with a check valve 32, preferably in the form of two flexible members 33 and 34. Flexible members 33 and 34 are resiliently biased toward each other to allow ingress of fluid into the elongate hollow member 12, when the first opening is below the surface of a liquid sample, as shown in FIG. 3A, by opening in response to a differential pressure between the interior and exterior elongate member 12, e.g., by pressure applied from the exterior or by virtue of a vacuum drawn on the interior of elongate member by the aspirator 26 (bulb). When the pressure in the interior of the elongate hollow member 12 is substantially equal to that on the exterior thereof, fluid flow into the elongate member 12 ceases and the check valve 32 closes, retarding egress of liquid out of the elongate member 12 through the opening 31.

Under the effect of a positive pressure differential between the interior of elongate member 12 and the exterior environment, produced, e.g., by squeezing the bulb 26 to increase the pressure within elongate member 12, check valve 36 preferably constructed similarly to the check valve 32, i.e., from two resilient members biased toward each other under normal conditions, opens allowing liquid to pass out of elongate member 12 through opening 14. Filter means 38 positioned within the elongate member 12 between the openings 31 and 14, preferably just above the check valve 36, acts to removes particulate contained in the liquid as it passes through the filter means thereby providing a liquid with a reduced amount of articulate contaminant therein.

Figure 4B:
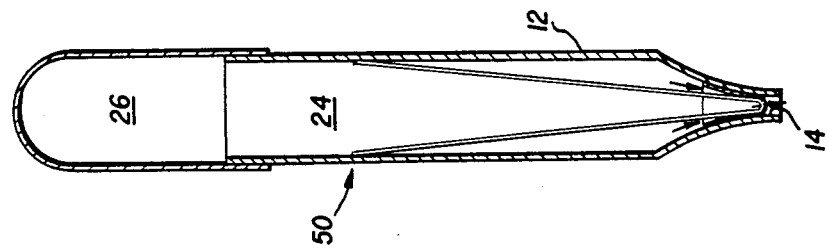
FIG. 4B illustrates a fourth embodiment of the present invention in a discharging mode.
Figure 4A:
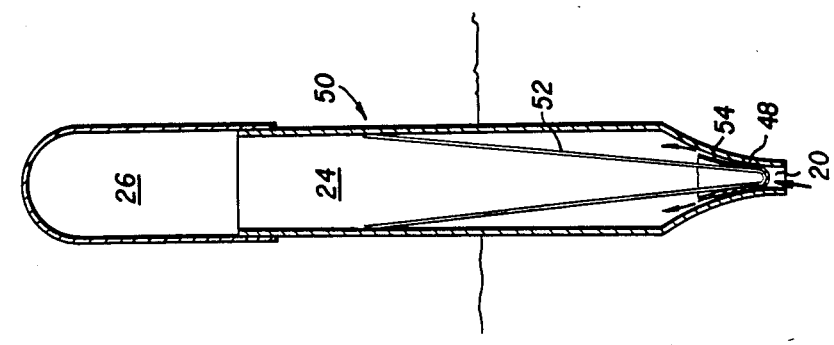
FIG. 4A illustrates a fourth embodiment of the present invention in a filling mode.

A fourth embodiment of the present invention, illustrated in FIGS. 4A and B, generally designated as 50, employs, like the preferred embodiments of FIGS. 1 and 2, a hollow member 12. Located proximate opening 14, at one end of the hollow member, is a filter member 48 which is preferably a hydrophobic conically-shaped depth filter. The depth filter is preferably formed from a disc of a depth filter material, such as that used in device 10 shown in FIG. 1. When the hollow member has the preferred circular cross section, disc 48 is a circular disc having a diameter larger than the internal diameter of hollow member 12, preferably on the order of about twice the diameter of the internal diameter of the hollow member. In a preferred embodiment in which the opening 14, formed in an end of the hollow member 12, has a tapered configuration, one or more tools is used to locate filter member 48 in the tapered portion of the hollow member and form a cone in which a peripheral edge 54 of the disc is formed in close and intimate contact with the internal wall of hollow member 12.

To assure proper location of the filter member 48 within device 50 and retention thereat, a filter member retention means 52 is employed. In a preferred embodiment, the filter member retention means comprises a piece of wire which is chemically inert toward particulate-containing liquids and substances commonly found therein with which the devices of the present invention may be used. The preferred filter member retaining means 52 has the general shape of a V, the apex of which engages the concave upward portion of the filter member 48. The ends of the wire retaining member 52 engage the side wall(s) of the hollow member in a region of the reservoir close to the aspirator bulb 26. Preferably the wire from which the retaining member 52 is formed has spring characteristics which provides positive engagement against the side wall(s) of the hollow member due to the biasing effect of the ends of the element 52 against the internal side wall(s) of the hollow member 12.

The device 50 is operated in a manner similar to the preferred embodiments previously discussed. That is, in a first step, the aspirator 26 is compressed to exhaust air from the device. The tip of the device is placed in a liquid sample such that opening 14 is completely below the surface of the liquid. The aspirator bulb is slowly released and liquid enters device 50 through opening 14 in the direction of the arrows shown in FIG. 4A. Thus, incoming liquid passes, to a small extent, through some of the pores of the hydrophobic depth filter member 50. However, with the filter member retaining means 52 contacting and locating the filter member 48 substantially at the center concave portion of the filter member, the force of the incoming liquid forces the peripheral edge 54 of the filter member 48 away from the internal surface of the hollow member 12. Thus, the conically-shaped filter member 48, in conjunction with the filter member retaining means 52 and the tapered portion of the internal wall(s) of the hollow member functions as a self-valving one-way valve with the peripheral edge 54 of the filter member 48 moving away from the valve seat or tapered portion of the hollow member 12 in the path of liquid flowing into the device.

After a sufficient volume of liquid has entered the reservoir portion of the device 50 and preferably a small amount of air has been admitted to purge the opening 14 and the filter member 48, the aspirator bulb 26 is compressed to discharge liquid from the device. Discharging, the liquid forces the peripheral edge 54 of the filter member 48 against the internal wall(s) of the hollow member 12, as shown in FIG. 4B. As indicated by the arrows therein, substantially all of the liquid passes through the pores of the hydrophobic depth filter 48. The device 50 removes particulate contaminant in part in the ingress or filling step as part of the liquid passes through depth filter member 48, but a major portion of particulate is removed in the egress or discharge step in which the only path open to discharging liquid is through the filter member 48.

While the invention has been described with regard to specific embodiments, it should be understood that various changes and modifications can be made in the details of the procedure, without departing from the scope and spirit of the invention; therefore, it is not intended to be limited except as indicated in the appended claims. For example, rather than using an aspirator bulb to create a pressure differential between the interior of the elongate member and the outside, a flexible, hollow elongate member can be used which, upon compression (or subsequent expansion to its original shape), creates a pressure differential. Similarly, while the hollow member is described as elongated, the relative length to width is premarily simply determined by the ease of handling.

We claim:

1. A device for reducing the amount of contaminant in a liquid sample comprising:
   a hollow elongate member having first and second opening means;
   hydrophobic depth filter means fixedly positioned in said hollow elongate member, said depth filter in combination with said hollow elongate member defining a reservoir between said depth filter and said first opening means; and
   means associated with said first opening means for generating a pressure differential between the interior of said hollow elongate member and the exterior thereof, for introducing a contaminant-containing liquid into the reservoir in said hollow elongate member exclusively through said second opening means, for drawing liquid through said depth filter into said reservoir, and for removing a liquid with a reduced amount of contaminant from said elongate member exclusively through said depth filter and said second opening, whereby contaminant is trapped within said depth filter.

2. The device according to claim 1 wherein said hydrophobic depth filter means in combination with said second opening means define an antechamber of smaller volume than said reservoir.

3. The device according to claim 1 wherein said hydrophobic depth filter is formed from a microporous material.

4. The device according to claim 1 wherein said depth filter means is located at said second opening means.

5. A device for reducing the amount of contaminant in a liquid sample comprising:
   a hollow elongate member having an opening means;
   a hydrophobic filter fixedly positioned in said hollow elongate member, said depth filter in combination with said hollow elongate member defining a reservoir between said depth filter and said opening means; and
   means associated with said opening means for generating a pressure differential between the interior of said hollow elongate member and the exterior thereof, for introducing a contaminant-containing liquid to said elongate member exclusively through said opening means, for drawing liquid through said depth filter into said reservoir, and for removing a liquid with a reduced amount of contaminant from said hollow elongate member exclusively through said depth filter and said opening means, whereby contaminant is trapped within said depth filter.

6. A device for reducing the amount of particulate contaminant in a liquid comprising:
   a hollow elongate member having an opening;
   filter means positioned in said elongate member and having first and second sides, said first side facing said opening and said second side in combination with the internal walls of said hollow elongate member defining a reservoir; and
   valve means associated with said filter means for permitting substantially unfiltered liquid flow from said opening to said reservoir in a first direction and filtered flow from said reservoir through said filter means to said opening in a second direction, said valve means being a one way valve including:
   at least one aperture formed in said filter means extending from said first side to said second side; and
   movable means completely detached from said filter means and located in said reservoir for sealing said aperture.

7. The device according to claim 6, further including a second opening in said hollow elongate member.

8. The device according to claim 7 wherein associated with said second opening is provided a means for generating a pressure differential between the interior of said elongate member and the exterior thereof to introduce liquid to said hollow elongate member through said opening in said first direction and discharge liquid in said second direction through the same opening.

9. The device according to claim 6 wherein formed integrally with said elongate member is provided a means for generating a pressure differential between the interior of said elongate member and the exterior thereof to introduce liquid to said hollow elongate member in said first direction through said opening facing said first side of said filter and discharge liquid in said second direction through the said opening.

10. The device according to claim 6 wherein said filter is a depth filter.

11. The device according to claim 10 wherein said filter is formed from a microporous, hydrophobic material.

12. The device according to claim 6, further including means for retaining said movable sealing means, said movable sealing means positioned intermediate said filter means and said retaining means.

13. The device of claim 12 wherein the largest dimension of said movable sealing means is greater than the distance between an internal wall of said hollow elongate member to the center of the said at least one aperture farthest from said wall and one half the width of the said at least one aperture which is farthest from said wall and said retaining means is spaced from said filter means by a distance less than said largest dimension of said movable sealing means.

14. The device of claim 13 wherein said filter means is a depth filter.

15. The device according to claim 6 wherein said movable sealing means includes a disc and said second side comprises a valve seat.

16. A device according to claim 15 wherein said detached movable means for sealing said aperture is in contact with said second side of said filter means when filtered flow is in a second direction.

17. A device for reducing the amount of particulate contaminant in a liquid comprising:
   a hollow elongate member having at least first and second openings;
   means associated with said first opening in a wall of said hollow elongate member for permitting ingress of unfiltered liquid into said elongate member through said first opening while retarding egress of liquid out of said elongate member through said first opening;

means associated with said second opening for permitting egress of filtered liquid out of said elongate member through said second opening while retarding ingress of liquid into said elongate member through said second opening; and filter means positioned in said elongate member between said first and second openings.

18. The device according to claim 17 wherein said filter means is a depth filter.

19. The device according to claim 18 wherein said depth filter is a microporous, hydrophobic material.

20. A device for reducing the amount of particulate contaminant in a liquid comprising:

a hollow elongate member having first, second, and third openings;

means associated with said first opening in a wall of said hollow elongate member for permitting ingress of liquid into said elongate member through said first opening while retarding egress of liquid out of said elongate member through said first opening;

means associated with said second opening for permitting egress of liquid out of said elongate member through said second opening while retarding ingress of liquid into said elongate member through said second opening;

filter means positioned in said elongate member between said first and second openings; and means associated with said third opening for generating a pressure differential between the interior of said hollow elongate member and the exterior thereof to introduce unfiltered liquid to said hollow elongate member through said first opening and discharge filtered liquid through said second opening.

21. The device according to claim 20 wherein said filter means is a depth filter.

22. The device according to claim 21 wherein said depth filter is a microporous, hydrophobic material.

23. A device for reducing the amount of particulate contaminant in a liquid comprising:

a hollow elongate member having at least first and second openings;

means associated with said first opening in a wall of said hollow elongate member for permitting ingress of liquid into said elongate member through said first opening while retarding egress of liquid out of said elongate member through said first opening;

means associated with said second opening for permitting egress of liquid out of said elongate member through said second opening while retarding ingress of liquid into said elongate member through said second opening;

filter means positioned in said elongate member between said first and second openings; and means formed integrally with said elongate member for generating a pressure differential between the interior of said elongate member and the exterior thereof to introduce unfiltered liquid to said hollow elongate member through said first opening and discharged filtered liquid through said second opening.

24. The device according to claim 23 wherein said filter means is a depth filter.

25. The device according to claim 24 wherein said depth filter is a microporous, hydrophobic material.

26. A device for reducing the amount of particulate contaminant in a liquid comprising:

a hollow elongate member having an opening;

filter means comprising a cone-shaped filter member, a portion of which is fixedly positioned in said elongate member and having first and second sides, said first side facing said opening and said second side in combination with the internal walls of said hollow elongate member defining a reservoir;

valve means in association with said filter means for permitting ingress of substantially unfiltered liquid from said opening into said reservoir through a first path between said filter means and the walls of said hollow elongate member in a first direction and egress of liquid from said reservoir through a second path through said filter means to said opening in a second direction while retarding egress of liquid from said reservoir through said first path and retention means contacting the filter member substantially at the center thereof.

27. The device according to claim 26 wherein said cone-shaped filter member is received in a tapered portion of said hollow elongate member and said means for permitting ingress and egress of liquid engages a concave portion of said cone-shaped member and the walls of said hollow elongate member.

28. The device according to claim 26 wherein said filter means is a flexible filter element.

29. The device according to claim 26 wherein said valve means is defined by said filter means and the walls of said hollow elongate member.

* * * * *

UNITED STATES PATENT AND TRADEMARK OFFICE
CERTIFICATE OF CORRECTION

PATENT NO. : 4,902,421

DATED : February 20, 1990

INVENTOR(S) : Frank R. Pascale, et al

It is certified that error appears in the above-identified patent and that said Letters Patent is hereby corrected as shown below:

Column 9, Claim 5, line 49, after "hydrophobic" insert --depth--.

On title page,
Item No. [56], References Cited, the following references were omitted, --4,287,065  9/81  Raines     604/190
              4,137.917  2/79  Cohen      604/190
              1,469,843  4/6/77  Great Britain
              1,463,807  2/9/77  Great Britain
              1,437,480  5/26/76 Great Britain
              1,379,452  1/2/75  Great Britain
              1,375,675  11/27/74 Great Britain--.

Signed and Sealed this

Thirtieth Day of March, 1993

*Attest:*

STEPHEN G. KUNIN

*Attesting Officer*   Acting Commissioner of Patents and Trademarks